United States Patent [19]
Gaughan

[11] Patent Number: 5,303,960
[45] Date of Patent: * Apr. 19, 1994

[54] EXPANSION JOINT WITH LOW FRICTION PACKED SEAL

[76] Inventor: John T. Gaughan, Box 4131, Long Grove, Ill. 60047

[ * ] Notice: The portion of the term of this patent subsequent to Aug. 3, 2010 has been disclaimed.

[21] Appl. No.: 101,382

[22] Filed: Aug. 2, 1993

Related U.S. Application Data

[63] Continuation-in-part of Ser. No. 671,088, Mar. 18, 1991, Pat. No. 5,232,251.

[51] Int. Cl.$^5$ ............................................. F16L 35/00
[52] U.S. Cl. ........................................ 285/93; 285/301; 285/337; 285/422; 285/910
[58] Field of Search ................. 285/93, 300, 294, 301, 285/337, 422, 910, 302

[56] References Cited

U.S. PATENT DOCUMENTS

| | | | |
|---|---|---|---|
| 982,836 | 1/1911 | Ley et al. | 285/302 |
| 1,873,703 | 8/1932 | Giesler | 285/300 |
| 1,968,715 | 7/1934 | Slade . | |
| 2,044,430 | 6/1936 | Hall | 285/300 |
| 3,053,554 | 9/1962 | Magos et al. . | |
| 3,232,640 | 2/1966 | Donkle | 285/93 |
| 4,046,407 | 9/1977 | Porreco . | |
| 4,448,449 | 5/1984 | Halling et al. | 285/910 X |
| 4,511,162 | 4/1985 | Broyles . | |
| 4,679,828 | 7/1987 | Bernardot | 285/422 X |

FOREIGN PATENT DOCUMENTS

| | | | |
|---|---|---|---|
| 663030 | 5/1963 | Canada | 285/300 |
| 1580462 | 9/1969 | France . | |
| 2272324 | 12/1975 | France | 285/299 |

Primary Examiner—Dave W. Arola

[57] ABSTRACT

This invention provides an expansion joint that uses a flexible sealing element in conjunction with a packed seal in a manner that allows a reduction in break-away forces and permits continued operation of the joint after a failure of the bellows or bellows attachment point. The expansion arrangement includes a flexible sealing element, usually in form of a bellows, and a containment chamber in communication with the exterior portion of the flexible sealing element or bellows and an interior portion of the packed seal. The containment chamber has an opening that permits relative movement between the ends of the expansion joint and is sealed by the packed seal. In the event of a bellows failure, the packing material acts to restrict or prevent leakage from the containment chamber to the outside environment. The packed seal is made of a combination of materials that provide packing friction coefficient of less than 200 lbs/in.

20 Claims, 2 Drawing Sheets

EXPANSION JOINT WITH LOW FRICTION PACKED SEAL

CROSS REFERENCE TO RELATED APPLICATIONS

This application is a continuation in part of U.S. Ser. No. 671,088 filed Mar. 18, 1991.

BACKGROUND OF THE INVENTION

1. Field of the Invention

This invention relates generally to expansion joints for piping systems. More specifically this invention relates to expansion joints having multiple sealing elements that allow relative movement between ends of the expansion joint.

2. Description of the Prior Art

Piping systems routinely expand and contract in response to changes in temperature, internal or external loadings and anchor movements. Many piping systems incorporate expansion joints that accommodate the expansion and contraction of the piping system by permitting relative movement between segments of the piping system. Common types of expansion joints include bellow type expansion joints and packed type expansion joints.

Packed type expansion joints consist of two overlapping pipe sections and packing material that fills the gap between the two pipe sections and provides a seal between the internal and external environments of the piping system. In most packing arrangements a flared section at the end of the overlapping pipe receives the packing material and a ring or collar urges the packing into the flared opening to provide the seal. At times, a packed joint can provide a good seal with only a relatively small compressive force. However, due to irregularities in the pipe, packing and compressive force application, a substantial compressive force is usually needed to provide a good seal. Thus, the ring ordinarily places relatively high compressive loads on the packing material. These high compressive loads create a high resistance to relative movement between the overlapping pipe sections. This high resistance, usually referred to as break-away force, can impose large forces on the piping system as it expands and contracts.

Another type of expansion joint uses a flexible sealing element, usually in the form of a bellows, to permit relative movement between pipe segments. When displaced, a bellows acts somewhat like a low k-factor (spring rate) spring and, together with any pressure loading from the piping, imposes a relatively constant force on the attached piping elements. The constant force associated with the bellows type expansion joint is usually much less than the break away force of a packed type expansion joint.

A bellow type expansion joint can be arranged such that the piping system pressure acts on the inside or outside of the bellows. U.S. Pat. No. 4,046,407 depicts a system where the piping system pressure acts on the outside of the bellows.

In order to function, the bellow must have a relatively thin wall in relation to the piping system. Thin bellows are susceptible to stress corrosion or chemical attack. This thin wall makes the bellows a weak link in the piping system that can rapidly and catastrophically fail. Apart from rendering the piping system inoperative, catastrophic bellows failures can impose serious safety hazards. Bellows failures in high temperature piping systems or confined piping areas, such as steam pipe tunnels, are especially dangerous.

As a safeguard against bellows failure, some expansion joints provide double bellows elements that operate in parallel. In such arrangements the expansion joint employs two independent bellows usually having the same ply thickness which is sized to withstand the total pressure loading of the system. Such an arrangement is shown in U.S. Pat. No. 4,511,162 issued to Broyles. In the Broyles patent, two independent bellows straddle a space between the pipe ends of the expansion joint. Broyles also provides a pressure tap to monitor the pressure in the gap between the bellows and thereby sense if a leak has developed in the bellows.

Although the double element expansion joint offers some protection against catastrophic bellows failure, the protection in many cases may not be substantial. Metal fatigue causes many bellows failures. A parallel arrangement for a double bellows expansion joint exposes both of the expansion joint elements to the same number and type of fatigue cycles. Therefore, both bellows elements approach fatigue failure at about the same time. If both bellows elements do not fail at the same time a catastrophic failure is happily avoided. Nevertheless, the failure of one bellows signals imminent failure of the other bellows and prudence dictates a shutdown of the system for replacement of both expansion joint bellows. Consequently, the failure of a single bellows ply in a double bellows expansion joint can still burden the piping system operator with an inopportune system shutdown. Moreover, many bellows failures occur at the point where the bellows attach to the pipe elements—a double element expansion joint provides no protection against failure of an expansion joint at the bellows to pipe attachment point which is generally the point of highest stress.

It is also known to use bellows type expansion joints in combination with packed type expansion joints. French Patent 1,580,462 and U.S. Pat. Nos. 3,053,554 and 1,968,715 show different combinations of solid packing and flexible expansion joint elements to provide a series of seals in an expansion joint. The seal materials and arrangements depicted in these references still impose the large breakaway forces as previously described.

Therefore, expansion joint elements have posed the problem of high displacement forces, in the case of packed joints or, in the case of bellows type expansion joints, the hazard of catastrophic failure or the inconvenience of unplanned shutdowns.

BRIEF SUMMARY OF THE INVENTION

It is an object of this invention to eliminate weak elements from piping systems.

It is further object of this invention to provide an expansion joint that reduces the loading on pipe segments in piping systems and is not subject to catastrophic failures or inconvenient shutdowns.

It is a yet further object of this invention to provide a bellows type expansion joint that is not rendered inoperable by failures of the pipe to bellows attachment point.

This invention provides an expansion joint that uses a flexible sealing element in conjunction with a low break away resistance packed seal in a manner that allows a reduction in break-away forces and permits continued operation of the joint after a failure of the bellows or bellows attachment point. The expansion arrangement includes a flexible sealing element, usually in the form of a bellows, and a containment chamber in communication with the exterior portion of the flexible sealing element or bellows and an interior portion of the packing material associated with the low resistance packed seal. The containment chamber has an opening that permits relative movement between the ends of the expansion joint and is sealed by the low resistance packed seal. In the event of a bellows failure, the low resistance packed seal acts to restrict or prevent leakage from the containment chamber to the outside environment. Thus, in normal operation, the flexible sealing element provides a leakproof seal and the packing serves as a backup seal which will in all cases restrict leakage from the bellows to the outside environment. Depending on the amount of force initially applied to the packing material, the low resistance packed seal, can stop any leakage from the bellow as soon as failure occurs. After failure of the bellows or primary sealing element, the low resistance packed seal alone can provide the necessary sealing of the joint and allow servicing of the joint to be deferred to a more convenient time. As a result, the expansion joint provides the catastrophic failure protection of a packed joint without its high break-away force or minor leakage and maintenance problems.

Accordingly in one embodiment, this invention is an expansion joint that comprises a first conduit extending from a first end of the joint and a second conduit longitudinally aligned with the first conduit, extending from a second end of the joint, and having an overlapping portion that surrounds the first conduit to form an annular opening between the first conduit and the second conduit. The expansion joint includes a flexible sealing element having a first end fixed to the first conduit and a second end fixed to the second conduit. The expansion joint also uses a secondary seal for sealing the annular opening which permits relative movement between the first conduit and the second conduit. The secondary seal comprises a combination of a packing material and a low friction surface on a portion of the first conduit in contact with the packing for relative sliding movement therewith. The packing and surface together produce a maximum packing friction factor of 200 pounds per inch of pipe circumference. A sleeve portion of the second conduit is adapted to receive the packing material and a collar urges the packing toward the sleeve, Means are provided for urging the collar toward the sleeve portion. The packing, sleeve portion and low friction surface provide the expansion joint with a low break away force and low sliding friction.

In a more limited embodiment this invention is an expansion joint comprising a first conduit extending from a first end of the joint and a second conduit coaxially aligned with the first conduit and extending from a second end of the expansion joint. An external sleeve, fixed to the second conduit and surrounding the first conduit, define an annular opening. A first means for sealing comprising a corrugated bellows having a first end proximate the first end of the joint and a second end proximate the second end of the joint, wherein the second end of the bellows is fixed to the first conduit and the first end of the bellows is fixed to the sleeve, provides a first seal. A secondary seal for sealing the annular opening comprises a wedge shaped packing material and a metallic portion of the first conduit in contact with the packing for relative sliding movement therewith. The packing and metallic portion together produce a maximum packing friction factor of 200 lbs/in of the first conduit circumference. A flared portion of the sleeve is adapted to receive the packing, and a collar is provided for urging the wedge shaped packing toward the sleeve. The expansion joint provides means for urging the collar toward the sleeve to provide a seal between the first conduit and the flared portion of the second conduit. The wedge shaped packing, the flared sleeve portion and the metallic portion provide the expansion joint with a low break away force and low sliding friction.

In a yet more limited embodiment, this invention is an expansion joint for piping systems having a protected bellows element. The expansion joint comprises a first conduit extending from a first end of the joint. The first conduit comprises a stainless steel base material having a maximum surface texture roughness of 200. A second conduit is coaxially aligned with the first conduit and extends from a second end of the joint. An external sleeve fixed to the second conduit surrounds the first conduit. The sleeve has a first section and a second section defining an annular space with the first conduit wherein the first section has a larger diameter than the second section and the second section has a flared end adapted to receive a wedge shaped packing. A corrugated bellows, located in the annular space between the first section of the external sleeve and the first conduit, has a first end proximate the first end of the joint and a second end proximate the second end of the joint. The second end of the bellows is fixed to the first conduit and the first end of the bellows is fixed to the first section of the sleeve. A chamber is defined, at least in part, by the inside of the bellows, the outside of the first conduit and the inside of the second section of the sleeve. A wedge shaped packing forms a seal between the flared end and the first conduit. The stainless steel material contacts the packing to produce a maximum packing friction factor of 200 lbs/in, and provides the expansion joint with a low break away force and low sliding friction. A collar urges the packing toward the sleeve to seal the chamber. Means are provided for urging the collar toward the sleeve.

Other aspects, embodiments, and details of this invention are presented in the following detailed description of the invention.

BRIEF DESCRIPTION OF THE INVENTION

DETAILED DESCRIPTION OF THE INVENTION

Figure 1:
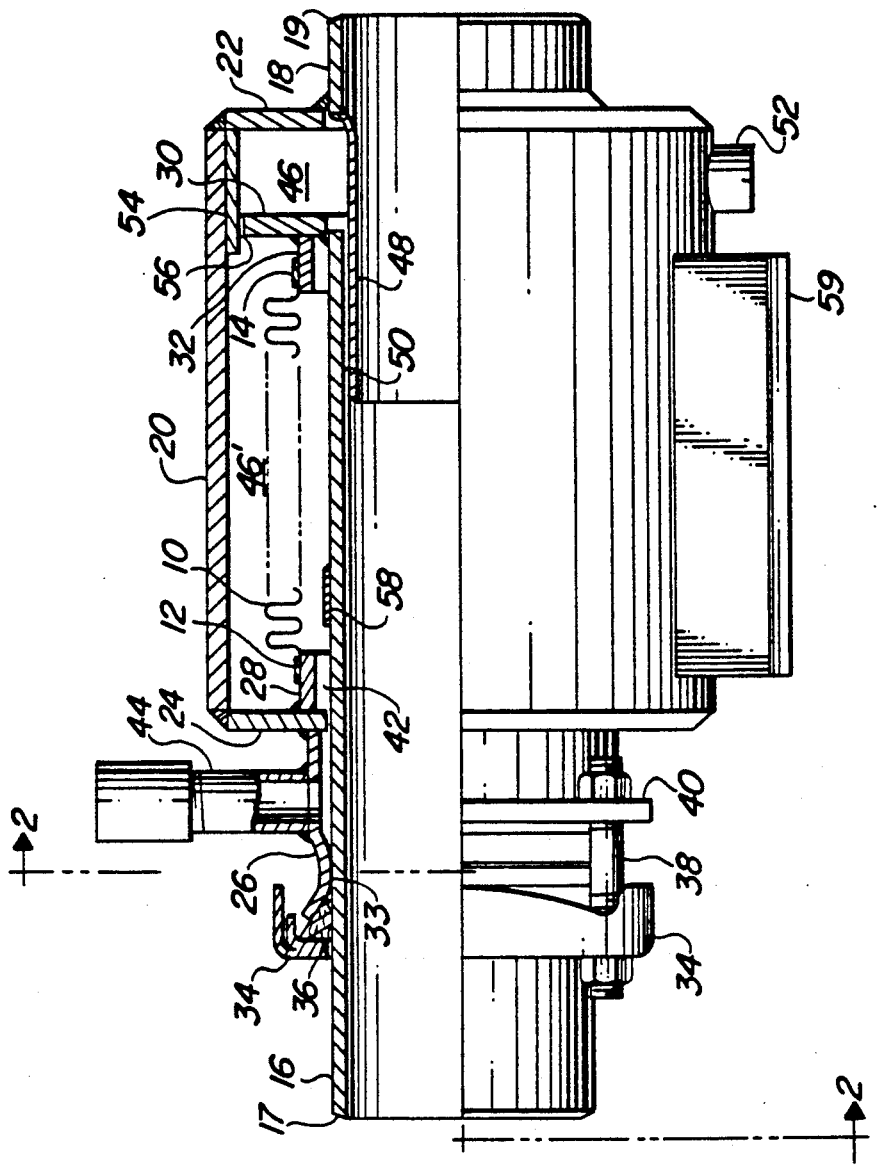
FIG. 1 is a split section side view of the expansion joint of this invention.
Figure 2:
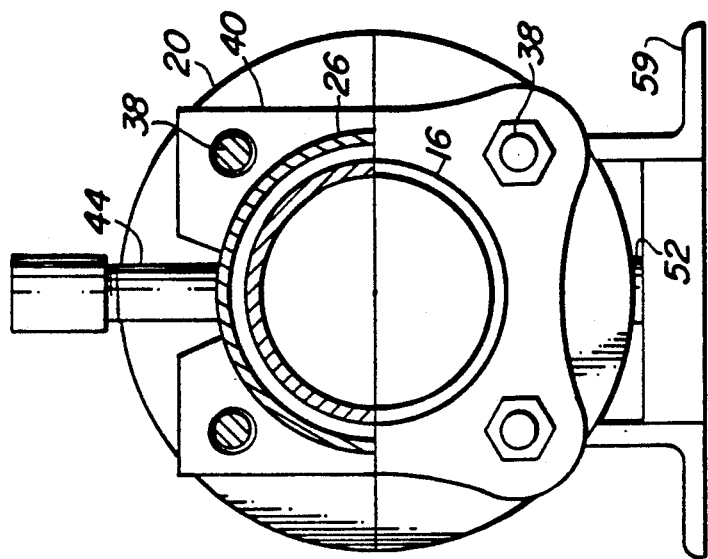
FIG. 2 is a split section end view of the expansion joint of FIG. 1.
Figure 3:
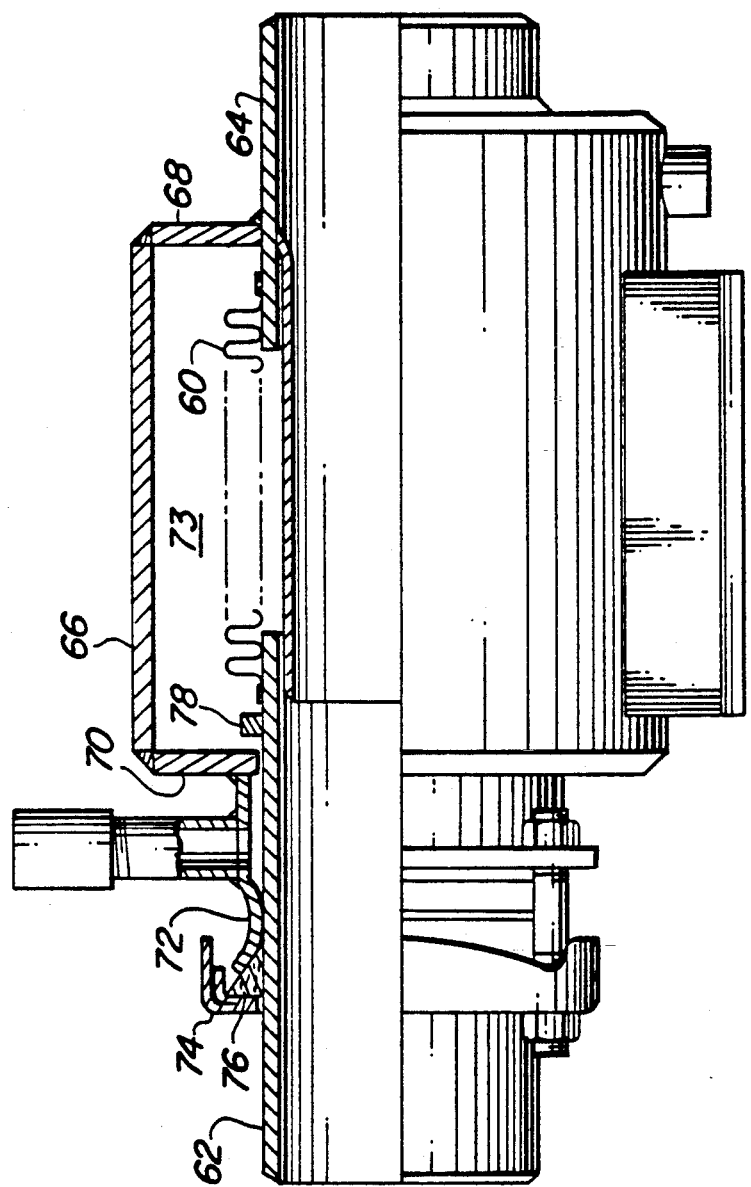
FIG. 3 is a split section side view of an alternate expansion joint arrangement of this invention.

This invention is more fully described in the context of the arrangements shown in FIGS. 1-3. The description of this invention in the context of these particular arrangements is not meant to limit the invention to the particular details shown therein.

FIGS. 1 and 2 illustrate an expansion joint arranged in accordance with this invention. The expansion joint has a sealing element in the form of a corrugated bellows 10. Welded attachment bars at a first attachment point 12 and a second attachment point 14 positively attach the opposite ends of the bellows 10 to a first expansion joint conduit, in the form of pipe section 16, that extends from a first end 17 of the expansion joint and a second expansion joint conduit, in the form of a pipe section 18, that extends from a second end 19 of the expansion joint. Pipe sections 18 is longitudinally aligned with the pipe section 16 of the first conduit. Thus, bellows 10 provides a sealed containment for the piping system between the two conduits of the expansion joint. The conduits are shown with beveled ends 17 and 19 for attachment to the piping system; however, the ends of the pipe can be attached to the piping system using any acceptable method including flanges or couplings. Any type of flexible sealing element can be used in place of bellows 10, so long as the sealing element is a continuous member that can be integrally attached to the expansion joint conduits and permits relative movements between its ends while imposing relatively small displacement forces at its attachment points. Particular details of bellows construction such as number of plies, ply thickness, number of convolutions or corrugations, bellows material, etc. can be determined for the particular piping system in question by ordinary methods well known to those skilled in the art.

The bellows 10 of FIG. 1 is arranged to operate with piping pressure on the outside of the bellows. Pressure on the outside of the bellows is usually the preferred arrangements since such pressure loading adds substantial strength to the bellows.

The externally pressurized expansion joint arrangement, as depicted in FIG. 1, attaches the first expansion joint conduit (pipe section 16) to one end of the bellows at attachment point 14 and the second conduit to the relatively farthest end of the bellows, attachment point 12. In order to attach the conduits to the relatively farthest ends of the bellows, each expansion joint conduit must extend axially past each other over the entire length of the bellows. The conduits are extended past the bellows and each other by using different sized conduits. For this purpose the entire length of one conduit may be made relatively larger. Alternatively, FIG. 1 shows pipe section 18 having a large diameter sleeve 20 that surrounds bellows 10 and the distal end of pipe section 16. An annular ring 22 attaches sleeve 20 to pipe 18. Another annular ring 24 connects the distal end of sleeve 20 to a sleeve 26 located between bellows 10 and expansion joint end 17. Yet another sleeve section 28 extends from annular ring 24 towards bellows 10 which is attached thereto at point 12. Pipe section 16 extends inwardly underneath bellows 10. An annular ring 30 radiates outwardly from the end of pipe section 16. A pipe sleeve 32 extends toward bellows 10 from ring 30. Sleeve 32 provides a surface for attachment point 14 of bellows 10.

In addition to the first sealing element (bellows 10), the expansion joint uses a second sealing element. The second sealing element provides a sliding seal that permits relative movement between the conduits of the expansion joint. The sliding seal comprises packing that seals a continuous gap between a segment of the first conduit and a segment of the second conduit. The first and second conduits can be arranged to place this gap at any location along the length of the expansion joint. FIG. 1 shows a gap 33 between pipe section 16 and sleeve 26. Those skilled in the art can readily envision arrangements for placing the gap in other locations. One such arrangement would replace sleeve 20 with an overlapping sleeve arrangement, having a gap somewhere in its middle. By varying their diameters, the two sleeve sections would replace sleeve 20 to provide a pair of overlapping sleeves with each sleeve attached to a different conduit of the expansion joint.

The packed type sliding seal can use any suitable combination of packing material, packing arrangement and low friction surface on the pipe or sleeve that will provide a packed seal with a low resistance to breakaway i.e. initial displacement of the expansion joint. The breakaway force is expressed in terms of an expansion joint packing friction force—$F_c$. $F_c$ is a function of the expansion joint friction factor—"K" and the pipe diameter. The low breakaway resistance of the packed seal is an important feature of this invention. It has been found that the packed seal can provide a reliable secondary seal that overcomes the problems of high breakaway forces when the combination of packing material, low friction surface and, in some cases, the packing arrangement together provide a K factor that does not exceed 200 lbs/in of pipe or sleeve circumference. Preferably the K factor will not exceed 100 lbs/in and more preferably the K factor will not exceed 50 lbs/in. The friction factor may be as low 10 lbs/in of pipe circumference.

A variety of packing material are suitable for providing the low break away resistance seal. In general the seal materials are selected based on piping temperature and the chemical environment in and around the piping. Significant features of the packing is that it have a low resistance to sliding and static friction and that it be chemically stable in the environment of the expansion joint service and while in contact with the low friction surface. Preferred gasket materials include Teflon and graphite. Other suitable gasket materials comprises blended combination of various rubbers, glass cloth and high temperature binders. Such gaskets are manufactured by Dresser Manufacturing Company. Acceptable gasket material may also comprise surfaces impregnated with materials such as Teflon, copper or aluminum.

The low friction surface has at least two important characteristics. The surface must b relatively smooth and also metallurgically and chemically stable when in the environment of the joint and contact with the packing material. By relatively smooth, the low friction surface will have a maximum surface texture roughness of 200. Suitable base materials for the low friction surface will generally comprise corrosion resistant metals. Preferred metallic elements in the low friction surface will include hard chrome and nickel. The base material for the low friction surface may be provided in a number of different ways: as the base metal of a pipe section; a sleeve covering a pipe section; a cladding or weld deposit over a pipe section; a plating or coating on a pipe section; etc. Preferred materials for the low friction surface include chrome plated surfaces, stainless steels, and high nickel, chrome and copper alloy commonly known as Inconel, Monel and Incoloy. In a particularly preferred arrangement of the low break away packed seal, the packing comprises a graphite coated material and a hard chrome plating covers the section of the pipe that contacts the packing.

Interaction between the low friction surface and the packing material can also be enhanced by the use of a lubricating agent. Suitable lubricating agents comprise high temperature greases. Synthetic greases are particularly suitable for this purpose.

The shape of the packing arrangement will also influence the breakaway resistance of the packed seal. A variety of different packing geometries and packing containment arrangements can be used. For example square or rectangular packing arrangements can be used in place of the wedge type packing shown in the Figures. Furthermore, it is also well known that the packing material can be held in place by containment devices such as threaded connections instead of the bolted ring as illustrated by the Figures.

A particularly effective packing arrangement that reduces the breakaway force of the packed seal uses a wedge shaped packing as depicted in FIG. 1 by reference number 36. In the packing arrangement of FIG. 1, drawing collar 34 towards sleeve 26 squeezes the packing material 36 against pipe sleeve 16 to provides any necessary compaction of the packing material to establish the seal between the pipe 16 and the sleeve 26. In the embodiment of FIG. 1, a set of four bolts pass through collar 34 and a retaining ring 40. Tightening the nuts on bolts 38 pulls ring 34 toward sleeve 26 to compress packing 36. The arrangement of sleeve 26, collar 34 and bolts 38 are readily obtained by splitting a standard compression pipe coupling such as a "Dresser Coupling".

Looking more specifically at the arrangement of FIG. 1, the sleeve portion 26 cooperates with a collar 34 to retain packing material 36 at the end of sleeve 26 and form the second seal between sleeve 26 and pipe section 16. In order to restrict the size of gap 33, sleeve 26 has an inner diameter that is only slightly greater than the outer diameter of pipe 16. Usually this gap has a width that is greater than 0 and less than $\frac{1}{8}$ of an inch. Packing 36 permits relative translation across the low break away seal between pipe section 16 and sleeve 26. The low break away seal can also be designed to permit relative angular displacements. This angular displacement capacity permits the expansion joint of this invention to accommodate some degree of angular displacement across the expansion joint ends. In most cases this angular displacement will be less than about 4° and preferably less than $\frac{1}{2}$°.

The packed seal is not affected by vibration or cycling in the same way as the flexible seal or expansion joint that forms the first seal. Therefore, as previously mentioned it is unlikely that both the flexible sealing element and the packed seal will fail at the same time or that the packed seal would fail catastrophically.

The expansion joint can also be provided with a means to detect leakage across the flexible sealing element or bellows. One such arrangement senses pressure in a chamber formed at least in part by the flexible sealing element, the first conduit, the second conduit and the packed seal. In FIG. 1 this chamber is indicated by number 42 and formed by pipe 16; bellows 10; sleeves 26, 28, and 32; and packing 36. A pressure tap 44 located on sleeve 26 communicates with chamber 42 across sleeve 26. By establishing a reference pressure in chamber 42 and using pressure tap 44 to monitor any fluctuation in the reference pressure, any leakage across the expansion joint can be detected. Pressure tap 44 can also be used to supply a gas to chamber 42 thereby controlling the environment in chamber 42 and, in particular, the exposure of the bellows to corrosive environments. Chamber 42 may also be operated at a slight positive pressure in the secondary containment zone to prevent harmful contaminants, such as ground water or corrosive brackish air, from entering the expansion joint and attacking the bellows inside surface. Using positive pressure to provide a secondary containment zone is particularly useful when the expansion joint is buried beneath the water table or in tunnels beneath streets where street salts may attack an exposed bellows element. Using positive pressure to provide a secondary containment zone is also particularly useful where the expansion and piping are located in confined areas such as tunnels to prevent containment of the atmosphere in such confined spaces.

Another chamber 46 is formed to the outside of the bellows. Chamber 46 is defined by rings 22 and 24; sleeves 28, 32, and 20; bellows 10; and a sleeve 48. The distal end of pipe 16 overlaps internal sleeve 48 that extends from the attachment point of ring 22 to pipe 18. Chamber 46 communicates with the fluid in the pipe system across a gap 50 between pipe 16 and internal sleeve 48. A drain fitting 52 provides an outlet for purging chamber 46 and withdrawing any accumulated moisture from the low point of the expansion joint that collects on the inside of sleeve 20. As can be seen, ring 30 separates a volume 46' from the total volume of chamber 46. The bottom of the expansion joint also includes an external support 59 for anchoring the piping system.

Ring 30 is also arranged to act in conjunction with a radially extending, torsional stop 54 which limits or prevents relative rotation of the expansion joint ends and protects the bellows against excessive torsional loads. For this purpose ring 30 has a slot 56 that receives the radially extending stop 54 and allows only controlled torsional movement while not interfering with axial movement of stop 54 relative to ring 30.

The expansion joint arrangement of FIG. 1 also provides stop that limit the extension and contraction of the expansion joint. An extension stop 58 prevents overextension of the expansion joint (which in the arrangement of FIG. 1 can cause overcompression of the bellows) by contacting the inner end of ring 24 when the expansion joint reaches its predetermined limit on axial extension. Overcompression of the expansion joint, and the resulting extension of the bellows, can be prevented by incorporating an appropriate stop at the end of torsional stop 54 that is opposite bellows 10 or by the contact of ring 30 with ring 22.

FIG. 3 depicts another arrangement of the expansion joint of this invention wherein the pressure from the piping acts against the interior of a bellows 60 having one end attached to a pipe section 62 and the other end attached to a pipe section 64. A sleeve 66 together with rings 68 and 70 form a chamber 73 that surrounds bellows 60. A small diameter sleeve section 72 is attached at the inner circle of ring 70 and together with a collar 74 and packing 76 forms a sliding seal with pipe 62. In all other respects the arrangement of FIG. 3 acts in essentially the same manner as the apparatus described in FIG. 1.

In the operation of either expansion joint the packed seal provides a prophylactic function until bellows 10 or 60 fails. Accordingly only the minimum expected sealing pressure need be applied to packing 36 or 76 when the expansion joint is first installed and while the flexible seal or bellows remains intact. Maintaining a low sealing pressure on the packing minimizes the breakaway force that the packed seal imposes on the piping system. Should the bellows fail, the packing will either completely prevent any escape of fluid from the expansion joint or permit only a small amount of leakage across the gap. If any minor leakage is objectionable, the sealing pressure on the packing can be increased as necessary to stop such leakage. The seal arrangement of this invention will eliminate high break away forces even where a substantial sealing pressure is needed to prevent leakage across the packed seal. Whether used with high or low sealing pressure, the second seal and its packed arrangement provides a useful safeguard against catastrophic bellows failure and the personal or environmental hazard that may occur.

A series of test were run using a low break away resistance seal of this invention. These tests demonstrate that the low break away seal of this invention provided an excellent seal with only minimal compaction pressure applied to the packing and that the packed seal of this invention provides very low break away forces when under compaction pressure.

EXAMPLE 1

An expansion joint having a nominal pipe size of 4 inches was used in this test. The pipe ends and inner housing of the expansion joint consisted of schedule 40 pipe having an actual outside diameter of 4.5 inches. Overall length of the expansion joint inner housing was 10". The outer housing consisted of one half of a standard style 38 Dresser Coupling that provided an inner housing length of 3.5". Plates welded to the housing ends created a sealed cavity in the expansion joint having an approximate total volume of 20.8 in$^3$.

The area of the pipe that contacts the packing material was hard chrome plated for a length of 4". The pipe base material, to which the chrome plating was applied, had a 250 surface texture. The hard chrome plating was electrolytically applied to a minimum thickness of 2 mils of engineering chromium per ASTM B650. The chromium surface was fissure free and smooth to a minimum hardness of 70 Rockwell 'C'.

The expansion joint was then prepared for testing. A high temperature synthetic grease, supplied by McMaster-Carr as Ultra High Temp Grease NLGI No. 2, was applied to the chrome surface of the inner housing. A high temperature graphite seal having a wedge shaped cross-section and manufactured by Dresser was slid over the inner housing. A collar was installed in contact with the seal using 4 bolts having a ⅜" diameter.

A pressure hold or leak test was performed on the expansion joint at two different bolt torque loads. The sealed expansion joint (see chamber 42) was pressurized up to 112 to 115 psig with plant air. The plant air entered the expansion joint through a pressure tap (see pressure tap 44) and an external block valve. After pressurization the plant air was allowed to leak out past the packing seal (see seal 36) under various bolt torques. The pressure in the expansion joint at various time intervals was recorded. Tables 1 and 2 list the results of the pressure testing.

TABLE 1

| Bolt Torque 5 FT-LBS | |
|---|---|
| Pressure PSIG | Elapsed Time MIN. |
| 115 | 0 |
| 105 | 92 |
| 96 | 180 |
| 88 | 273 |
| 83 | 351 |
| 20 | 4230 |

TABLE 2

| Bolt Torque 10 FT-LBS | |
|---|---|
| Pressure PSIG | Elapsed Time MIN. |
| 112 | 0 |
| 100 | 30 |

TABLE 2-continued

| Bolt Torque 10 FT-LBS | |
|---|---|
| Pressure PSIG | Elapsed Time MIN. |
| 58 | 960 |

The data shows that the packed seal of this invention had excellent sealing characteristics at very low bolt loads. Furthermore, the pressure testing of the expansion joint with the higher bolt torque had a comparable leak rate to the that of the lower bolt torque test. Thus, this test data demonstrates that the sealing characteristics were somewhat independent of bolt load.

EXAMPLE 2

The same expansion joint was then tested to determine the static and dynamic friction loads i.e. the break away and sliding loads. The expansion joint was prepared for this test by removing the end plates for the pressure testing and extending the length of the inner pipe by 2 inches. The chrome surface in contact with the graphite seal still contained the high temperature grease from the pressure test. The expansion joint was then placed on a hydraulic press that contained a digital scale. The expansion joint was slowly compressed under three different bolt torque loadings. The results of the this testing are listed in Table 3.

TABLE 3

| Bolt Torque FT-LBS | 5 | 10 | 15 |
|---|---|---|---|
| Break Away Load LBS | 76 | 82 | 95 |
| Sliding Load LBS | 22 | 19 | 19 |

These test result show that the expansion joint of this invention exhibited extremely low break away and sliding friction loads.

I claim:

1. An expansion joint comprising:
   a first conduit extending from a first end of said joint;
   a second conduit longitudinally aligned with said first conduit, extending from a second end of said joint and having an overlapping portion that surrounds said first conduit to form an annular opening between said first conduit and said second conduit;
   a flexible sealing element having a first end fixed to said first conduit and a second end fixed to said second conduit;
   a secondary seal for sealing said annular opening and permitting relative movement between said first conduit and said second conduit, said secondary seal comprising a combination of a packing material and a low friction surface on a portion of said first conduit in contact with said packing for relative sliding movement therewith said packing and surface together producing a maximum packing friction factor of 200 lbs/in of first conduit circumference, a sleeve portion of said second conduit adapted to receive said packing material, and a collar for urging said packing toward said sleeve, said packing forming a seal between said first conduit and said sleeve portion of said second conduit, and;
   means for urging said collar toward said sleeve portion, said packing, said sleeve portion and said low friction surface providing said expansion joint with a low break away force and low sliding friction.

2. The expansion joint of claim 1 wherein said flexible sealing element comprises a corrugated bellows.

3. The expansion joint of claim 1 wherein said portion of said first conduit comprises a chrome alloy metal and said chrome alloy provides a corrosion resistant surface.

4. The expansion joint of claim 3 wherein said corrosion resistant surface has a maximum surface texture roughness of 200.

5. The expansion joint of claim 3 wherein said chrome alloy comprises stainless steel and said portion of said sleeve in contact with said packing has a maximum surface texture roughness of 200.

6. The expansion joint of claim 1 wherein said portion of said first conduit comprises a Teflon surface.

7. The expansion joint of claim 1 wherein said second conduit and said sleeve portion define a chamber in communication with said packing and said expansion joint includes means for sensing pressure within said chamber.

8. The expansion joint of claim 1 wherein said sleeve portion is located proximate said first end of said expansion joint.

9. The expansion joint of claim 1 wherein an end stop is fixed to at least one of said first and second conduits to restrict relative axial movement between said first and second conduits.

10. The expansion joint of claim 1 wherein the minimum diameter of said flared sleeve portion defines a maximum gap between said sleeve and said first conduit of less than ⅛'.

11. The expansion joint of claim 1 wherein said low friction surface comprises a metallic plating deposited on said portion of said first sleeve.

12. The expansion joint of claim 1 wherein said low friction surface comprises a sleeve surrounding said portion of said first sleeve.

13. The expansion joint of claim 1 wherein said packing material comprises graphite.

14. The expansion joint of claim 1 wherein said packing friction factor is less than 100 lbs/in of first conduit circumference.

15. An expansion joint comprising:
a first conduit extending from a first end of said joint;
a second conduit coaxially aligned with said first conduit and extending from a second end of said joint;
an external sleeve fixed to said second conduit and surrounding said first conduit to define an annular opening;
a first means for sealing comprising a corrugated bellows having a first end proximate said first end of said joint and a second end proximate said second end of said joint, wherein said second end of said bellows is fixed to said first conduit and said first end of said bellows is fixed to said sleeve;
a secondary seal for sealing said annular opening comprising a wedge shaped packing material and a metallic portion of said first conduit in contact with said packing for relative sliding movement therewith, said packing and metallic portion together producing a maximum packing friction factor of 200 lbs/in of first conduit circumference, a flared portion of said sleeve adapted to receive said packing, and a collar for urging said wedge shaped packing toward said sleeve; and;
means for urging said collar toward said sleeve to provide a seal between said first conduit and said flared portion of said second conduit, and said wedge shaped packing, said flared sleeve portion and said metallic portion providing said expansion joint with a low break away force and low sliding friction.

16. The expansion joint of claim 15 wherein said metallic portion comprises a chrome alloy and has an outside surface with a maximum surface texture roughness of 200.

17. The expansion joint of claim 16 wherein said first conduit comprises stainless steel.

18. The expansion joint of claim 17 wherein said packing friction factor is less than 50 lbs/in of first conduit circumference.

19. The expansion joint of claim 15 wherein said metallic portion of said first conduit comprises an outer sleeve.

20. An expansion joint for piping systems having a protected bellows element said joint comprising:
a first conduit extending from a first end of said joint said first conduit comprising a stainless steel base material having a surface texture of 200 or higher;
a second conduit coaxially aligned with said first conduit and extending from a second end of said joint;
an external sleeve fixed to said second conduit and surrounding said first conduit, said sleeve having a first section and a second section defining an annular space with said first conduit wherein said first section has a larger diameter than said second section and said second section having a flared end adapted to receive a wedge shaped packing;
a corrugated bellows located in said annular space between said first section of said external sleeve and said first conduit and having a first end proximate said first end of said joint and a second end proximate said second end of said joint, wherein said second end of said bellows is fixed to said first conduit and said first end of said bellows is fixed to said first section of said sleeve;
a chamber defined at least in part by the inside of said bellows, the outside of said first conduit and the inside of said second section of said sleeve;
a wedge shaped packing, forming a seal between said flared end and said first conduit, said stainless steel material contacting said packing to produce a maximum packing friction factor of 200 lbs/in, and provide said expansion joint with a low break away force and low sliding friction, and a collar for urging said packing toward said sleeve to seal said chamber; and, means for urging said collar toward said sleeve.

* * * * *